(12) United States Patent
Fischer et al.

(10) Patent No.: US 9,687,778 B1
(45) Date of Patent: Jun. 27, 2017

(54) SYSTEMS AND METHODS FOR DRYING A COMPRESSED GAS

(71) Applicant: The Fischer Group, Inc., Crown Point, IN (US)

(72) Inventors: Norman-David Paul Fischer, Cedar Lake, IN (US); Julie Ann Fischer, Cedar Lake, IN (US)

(73) Assignee: The Fischer Group, Inc., Crown Point, IN (US)

( * ) Notice: Subject to any disclaimer, the term of this patent is extended or adjusted under 35 U.S.C. 154(b) by 0 days.

(21) Appl. No.: 15/134,483

(22) Filed: Apr. 21, 2016

(51) Int. Cl.
*B01D 53/26* (2006.01)
*B01D 53/04* (2006.01)
*F26B 3/04* (2006.01)
*F26B 21/08* (2006.01)
*B01D 53/28* (2006.01)

(52) U.S. Cl.
CPC ....... *B01D 53/261* (2013.01); *B01D 53/0446* (2013.01); *B01D 53/0462* (2013.01); *B01D 53/28* (2013.01); *F26B 3/04* (2013.01); *F26B 21/083* (2013.01)

(58) Field of Classification Search
CPC .. B01D 53/261; B01D 53/0462; B01D 53/28; B01D 53/0446; F26B 3/04; F26B 21/083
USPC ............ 34/472, 473, 80; 95/10, 12, 14, 115, 95/117, 121–124; 96/109, 111, 112, 121, 96/126–128, 152
See application file for complete search history.

(56) References Cited

U.S. PATENT DOCUMENTS

| 3,147,095 | A | * | 9/1964 | Kanuch | .................. B01D 53/26 96/113 |
| 5,938,819 | A | * | 8/1999 | Seery | ................... B01D 53/053 95/104 |
| 6,099,620 | A | | 8/2000 | Arno et al. | |
| 7,279,026 | B1 | | 10/2007 | Fresch et al. | |
| 2003/0037672 | A1 | * | 2/2003 | Sircar | ............... B01D 53/0462 95/96 |
| 2003/0233941 | A1 | | 12/2003 | Battershell et al. | |
| 2007/0000382 | A1 | * | 1/2007 | Ackley | .................. B01D 53/62 95/90 |
| 2009/0301300 | A1 | | 12/2009 | Couturier | |
| 2014/0223767 | A1 | | 8/2014 | Arno | |
| 2014/0224125 | A1 | | 8/2014 | Arno et al. | |
| 2014/0260967 | A1 | | 9/2014 | Gitschlag | |

(Continued)

OTHER PUBLICATIONS

Kaeser Compressors Brochure, 2015.
Desiccant Air Dryers Brochure, 2007.

*Primary Examiner* — Frank Lawrence
(74) *Attorney, Agent, or Firm* — Hartman Global IP Law; Gary M. Hartman; Domenica N. S. Hartman

(57) ABSTRACT

Systems, equipment and methods suitable for drying a gas, for example a compressed gas, that utilize a drying cycle during which the gas flows through one or more dryer tanks and a desiccant material therein adsorbs a liquid entrained in the compressed gas to produce a dried compressed gas. A regeneration cycle is employed during which a purge gas flows through a purge gas dryer tank. During one or more phases of the regeneration cycle, a desiccant material within the purge gas dryer tank is employed to adsorb water vapor entrained in the purge gas to produce a dried purge gas, which is then directed through the dryer tank as part of the regeneration cycle performed on the desiccant materials within the dryer tanks.

24 Claims, 9 Drawing Sheets

(56) References Cited

U.S. PATENT DOCUMENTS

2015/0209716 A1 7/2015 Ericson et al.
2015/0362228 A1 12/2015 Ivashin et al.

* cited by examiner

SYSTEMS AND METHODS FOR DRYING A COMPRESSED GAS

BACKGROUND OF THE INVENTION

The present invention generally relates to systems, equipment and methods for drying compressed gases, including but not limited to air.

The process of air compression concentrates atmospheric water vapor, resulting in condensation that can be harmful to processes and equipment that use compressed air and conduit systems (e.g., piping, tubing, etc.) that deliver the compressed air to those processes and equipment. For this reason, air dryers are widely used to remove water vapor from compressed air. Desiccant dryers are a well-known type of compressed air dryer used in a wide range of industrial and commercial facilities. Desiccant dryers typically operate to reduce the dew point of compressed air to at least about −40° C. (about −40° F.), which is sufficient to prevent water condensation under most conditions found in industrial and commercial facilities.

There are different types of desiccant dryers (also referred to as regenerative desiccant dryers or regenerative dryers), each characterized by certain advantages and drawbacks. However, desiccant dryers generally share in common the principle of using a desiccant to adsorb moisture from compressed air (or another gas) by passing the compressed air through a pressure vessel such as a tower or tank (hereinafter simply referred to as a "tank") that contains a "bed" of suitable desiccant media, nonlimiting examples of which include activated alumina and silica gels. The desiccant material adsorbs water molecules from the compressed air, with the result that over time the desiccant bed eventually becomes saturated and can no longer effectively remove water from moisture-bearing compressed air entering the tank. To provide for continuous operation, a second tank of desiccant material is often provided so that the incoming compressed air can be switched between tanks when one tank becomes saturated. As one tank (hereinafter, the "in-service tank") continues to dry the incoming moisture-bearing compressed air, the other tank (hereinafter, the "regenerating tank") undergoes a "regeneration" process by which the moisture is purged from the desiccant material on which it was adsorbed.

One regeneration approach is to draw some of the dried compressed air from the in-service tank and use it to purge the desiccant bed undergoing regeneration in the regenerating tank. Typically, moisture-bearing compressed air undergoing drying in an in-service tank flows downward or upward through the desiccant in the tank, and dried compressed air used to remove moisture from the desiccant flows in the opposite direction through the regenerating tank in what is sometimes referred to as counter-flow regeneration. The moisture is effectively forced from the surfaces of the desiccant and removed at the lower end of the regenerating tank. In-service and regenerating tanks can be monitored to determine when regeneration should be performed on the in-service tank and regeneration has been completed on the regenerating tank, or regeneration can be performed on a time basis.

In what is sometimes referred to as "heatless drying," the regeneration approach described above can be performed without heating the dried compressed "purge" air drawn from the in-service tank. Alternatively, the dried compressed purge air can be heated prior to being introduced into the regenerating tank to remove moisture from the desiccant within, after which the desiccant is typically cooled with unheated dried compressed air drawn from the in-service tank prior to returning the regenerating tank to in-service status. Though requiring the addition of a heater, this approach advantageously reduces the volume of dried compressed air needed to complete a regeneration cycle. Yet another alternative is to use heated atmospheric air as the purge air, after which the desiccant can be cooled with unheated dried compressed air drawn from the in-service tank. Though further requiring the addition of a heater to heat the purge air and a blower to force the purge air through the regenerating tank, a significant advantage of this approach is that it further reduces the volume of dried compressed air needed to complete the regeneration process.

Though the above regeneration approaches are well known and accepted in the art, it would be desirable if other approaches were available that might be capable of improving the efficiencies and/or reducing the cost of drying compressed air, particularly in industrial and commercial facilities.

BRIEF DESCRIPTION OF THE INVENTION

The present invention provides systems, equipment and methods suitable for drying a compressed gas.

According to one aspect of the invention, a system is provided having at least first and second dryer tanks for drying a compressed gas to produce a dried compressed gas. The first and second dryer tanks each have an interior cavity and a desiccant material within the interior cavity adapted to adsorb a liquid entrained in the compressed gas and produce the dried compressed gas. The system also has a system inlet through which the compressed gas enters the system and a system outlet through which the dried compressed gas exits the system. The system further comprises a purge gas dryer tank having an interior cavity, means for pumping a purge gas through the interior cavity of the purge gas dryer tank, and a purge gas desiccant material within the interior cavity of the purge gas dryer tank and adapted to adsorb water vapor entrained in the purge gas and produce a dried purge gas therefrom. Means is provided for heating the purge gas pumped through the interior cavity of the purge gas dryer tank to produce a heated purge gas, and connecting means is provided for selectively fluidically connecting the purge gas dryer tank to the first and second dryer tanks to regenerate the desiccant materials therein by flowing the dried or heated purge gas therethrough to remove the liquid adsorbed on the desiccant materials.

A preferred aspect of a system comprising the elements described above is the ability for the system to perform a drying cycle as the compressed gas flows through the desiccant material of the first and/or second dryer tanks to produce the dried compressed gas, and then to perform a regeneration cycle on that dryer tank that includes heating and cooling phases. During the heating phase, the heating means is used to heat the purge gas (e.g., atmospheric air) and produce the heated purge air, which is then directed through the dryer tanks to remove the liquid adsorbed on its desiccant material thereof. During the cooling phase, the purge gas desiccant material within the purge gas dryer tank is used to dry the purge gas and produce the dried purge air, which is then directed through the dryer tank to cool the desiccant material thereof.

Another aspect of the invention includes a system for drying a compressed gas to produce a dried compressed gas, in which the system has a system inlet through which the compressed gas enters the system, a system outlet through which the dried compressed gas exits the system, and at least first and second dryer tanks. Each of the first and second dryer tanks has an interior cavity to which a dryer tank inlet and a dryer tank outlet are fluidically connected. The dryer tank inlet is fluidically connected to the system inlet and the dryer tank outlet is fluidically connected to the system outlet, whereby the compressed gas entering the first and second dryer tanks through the dryer tank inlets thereof flows through the interior cavities of the first and second dryer tanks. First and second desiccant materials are within the interior cavities of, respectively, the first and second dryer tanks, and are effective to adsorb a liquid entrained in the compressed gas that enters the system through the system inlet to produce the dried compressed gas that exits the system through the system outlet. The system includes means for switching between the first and second dryer tanks whereby the compressed gas is caused to selectively flow through either or both of the first and second dryer tanks at any given time. The system also includes a purge gas unit that comprises a purge gas inlet, at least one purge gas dryer tank having an interior cavity and a purge gas desiccant material within the interior cavity thereof and adapted to adsorb water vapor, pumping means adapted to draw a purge gas from the purge gas inlet and pump the purge gas through the purge gas desiccant material of the purge gas dryer tank, and heating means adapted to heat the purge gas prior to the purge gas being pump through the purge gas desiccant material of the purge gas dryer tank. Connecting means is provided for selectively causing the purge gas to flow from the purge gas dryer tank to either the dryer tank inlet of the first dryer tank, the dryer tank inlet of the second dryer tank, or a system exhaust. The system is configured and operable to perform a drying cycle during which the compressed gas enters the first dryer tank through the dryer tank inlet thereof, the compressed gas flows through the interior cavity of the first dryer tank, the first desiccant material adsorbs the liquid entrained in the compressed gas to produce the dried compressed gas, and the dried compressed gas exits the system through the system outlet. The system is also configured and operable to perform a regeneration cycle during which the pumping means draws the purge gas from the purge gas inlet and causes the purge gas to flow through the interior cavity of the purge gas dryer tank and then flow through the first dryer tank to remove the liquid adsorbed on the first desiccant material thereof.

Another aspect of the invention includes methods of regenerating a desiccant material within at least a first dryer tank configured for drying a compressed gas. Such a method includes a regeneration cycle that uses a purge gas and comprises heating and cooling phases. During the heating phase, the purge gas is heated to produce a heated purge gas, which is then directed through the first dryer tank to regenerate the desiccant material therein by removing liquid adsorbed on the desiccant material. During the cooling phase, the purge gas is pumped through a purge gas dryer tank containing a purge gas desiccant material to adsorb water vapor entrained in the purge gas to produce a dried purge gas, which is then directed through the first dryer tank to cool its desiccant material.

Other aspects of the invention include components suitable for use in the systems and methods described above, including but not limited to a gas distribution means within the dryer tanks between the inlets and desiccant materials thereof for promoting distribution of the compressed gas and the purge gas through the desiccant materials, a gas barrier means within the dryer tanks between the desiccant materials and outlets thereof for contacting and constraining the desiccant materials and generating a back pressure to thereby promote distribution of the compressed gas flow and the purge gas flow through the desiccant materials, and a thermal dispersion means within the dryer tanks and embedded in the desiccant material thereof for conducting heat within the desiccant materials to the walls of the dryer tanks.

Technical effects of the systems and methods described above preferably include the ability to improve the efficiencies and/or reduce the operating costs associated with drying a compressed gas, for example, air used in industrial and commercial facilities. In preferred embodiments, systems and methods as described above can completely eliminate the use of a dried compressed gas produced using a desiccant material in a dryer tank for the purpose of regenerating a desiccant material in another dryer tank.

Other aspects and advantages of this invention will be better appreciated from the following detailed description.

DETAILED DESCRIPTION OF THE INVENTION

Figure 1:
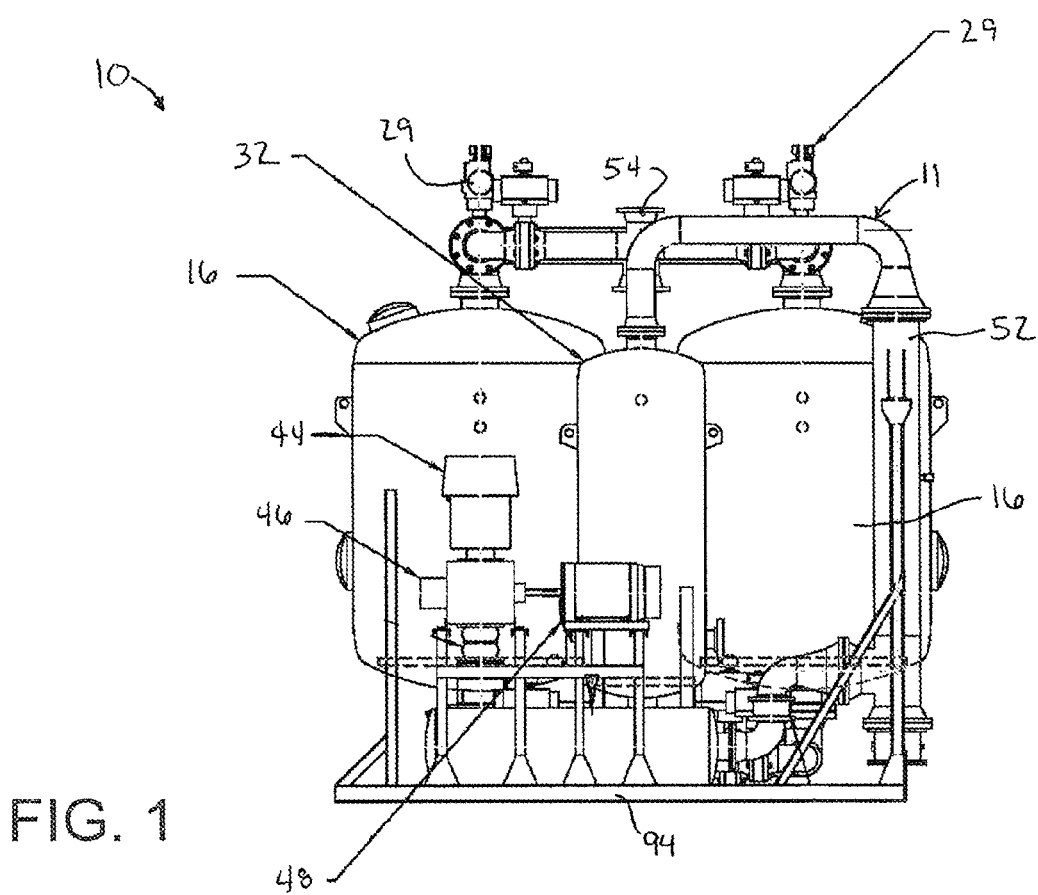
FIGS. 1, 2 and 3 schematically represent front, top and side views, respectively, of a desiccant dryer system comprising two dryer tanks and a purge gas dryer tank in accordance with a nonlimiting embodiment of this invention.
Figure 2:
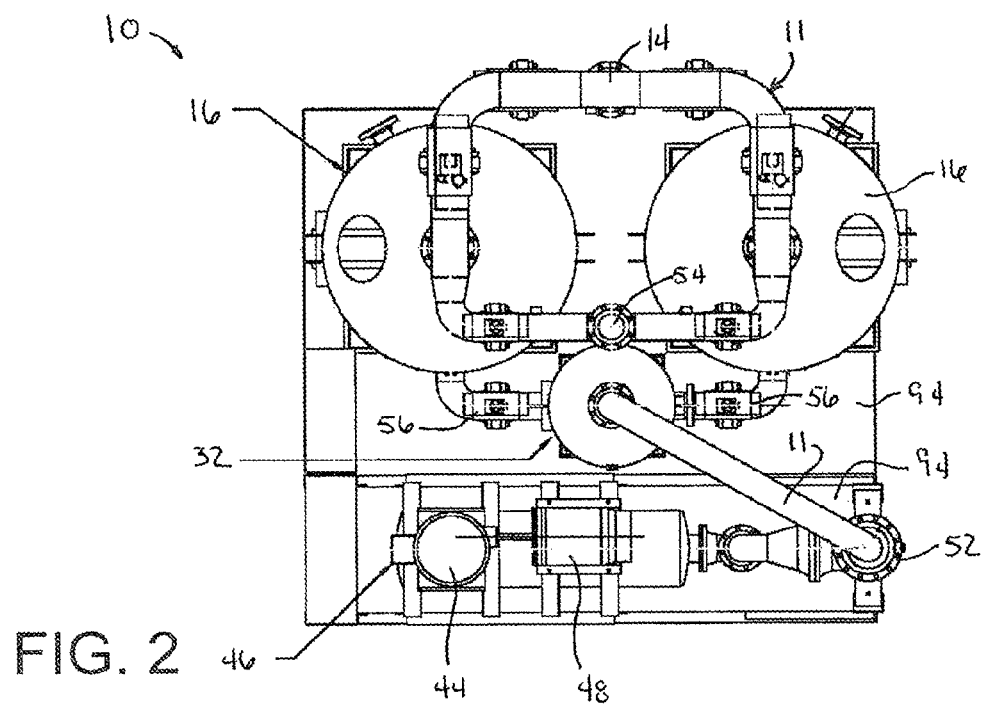
Figure 3:
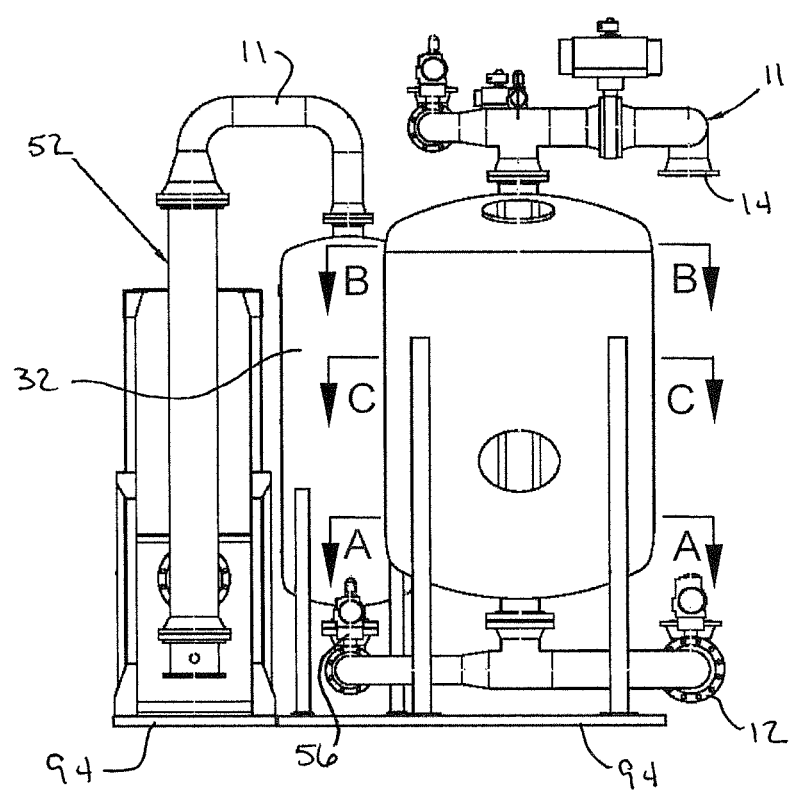

FIGS. 1 through 3 represent a pictorial depiction of a nonlimiting embodiment of a system 10 configured for drying a gas, for example, compressed air, for use in an industrial or commercial facility. To facilitate the description provided below of the embodiment represented in the drawings, relative terms, including but not limited to, "vertical," "horizontal," "lateral," "front," "rear," "side," "forward," "rearward," "upper," "lower," "above," "below," "right," "left," etc., may be used in reference to the orientation of the system 10 when installed for use as represented in the drawings, and therefore are relative terms that indicate the construction, installation and use of the invention and therefore help to define the scope of the invention. Though not discussed in any detail, it should be understood that various codes will typically be applicable to gas dryer systems of the type described herein, and those knowledgeable in the art will ordinarily design the system 10 and its components to meet such codes.

The system 10 represented in FIGS. 1 through 3 will be initially described in reference to the fluid circuit diagrams represented in FIGS. 9 through 12, with certain components of the system 10 identified in FIGS. 9 through 12 also illustrated in FIGS. 1 through 3. FIGS. 9 through 12 represent the system 10 as comprising a conduit (e.g., piping, tubing, etc.) network 11 that includes a system inlet 12 through which a gas enters the system 10 and a system outlet 14 through which the gas (having a reduced moisture content) exits the system 10. The gas will be referred to herein as compressed air (or simply air), for example, generated by a compressor (not shown) of any suitable type, though it should be understood that the system 10 is not limited to operating on compressed air. The system 10 includes at least two dryer tanks 16, each having an interior cavity 18 (FIGS. 4, 5 and 6), a dryer tank inlet 20 shown as located at a lower end 24 thereof, and a dryer tank outlet 22 shown as located at an upper end 26 thereof that are both fluidically connected to the interior cavity 18. The inlet 20 of each tank 16 is fluidically connected by the conduit network 11 to the system inlet 12 and the dryer tank outlet 22 of each tank 16 is fluidically connected by the conduit network 11 to the system outlet 14. FIGS. 9 through 12 show the compressed air as flowing through at least one valve 28 while en route in the conduit network 11 from the system inlet 12 to each tank 16, and that the compressed air enters the dryer tanks 16 through their inlets 20, flows upwardly through their interior cavities 18, exits through their tank outlets 22, and flows through at least one valve 29 while en route in the conduit network 11 to exit the system 10 through its outlet 14. As will be discussed in further detail below, FIGS. 9 through 12 show the valves 28 and 29 as operable so that the compressed air only flows through one of the tanks 16 (FIGS. 9, 11 and 12) or both tanks 16 (FIG. 10) (herein referred to as the "in-service" dryer tank or tanks 16) so that what will be referred to as a drying cycle of the system 10 occurs within the in-service dryer tank(s) 16 and so that what will be referred to as a regeneration cycle of the system 10 (represented in FIG. 11) can be performed on the other tank 16 (herein referred to as the "regenerating" dryer tank 16). As such, the valves 28 and 29 operate as means for switching between the dryer tanks 16 to enable the system 10 to continuously operate to dry the compressed air entering the system inlet 12. In addition to the valves 28 and 29 (one of each is associated with each dryer tank 16), the system 10 further includes additional valves 56, 58, 60, 62 and 64, discussed below. The valves 28, 29, 56, 58, 60, 62 and 64 may be manually operated and/or any suitable control system may be used to automate their operation. Furthermore, the system 10 is not limited to operating with any particular type of valves, and any suitable device capable of selectively permitting and preventing flow through portions of the conduit network 11 are within the scope of the invention.

Each of the dryer tanks 16 contains a bed of desiccant material (not shown) within its interior cavity 18 to adsorb water vapor (and possibly other liquids) entrained in the compressed air as it flows through the dryer tank 16, reducing the moisture content of the compressed air to produce what will be referred to herein as a dried compressed air (or simply dried air) that eventually exits the system 10 through its outlet 14, during which time the valve 29 is open and the valves 56, 60, 62 and 64 are closed. As previously noted, this operation is the drying cycle of the system 10 and occurs within the in-service dryer tank(s) 16. It is foreseeable that a variety of desiccant materials could be used or developed, with notable but nonlimiting examples including activated alumina and silica gels. The degree to which the compressed air may or must be dried will depend on the particular intended end use of the compressed air, a nonlimiting example being a dew point of −40° C.

The system 10 is represented in FIGS. 9 through 12 as further including what will be termed a purge gas unit 30 that is interconnected to both dryer tanks 16 through the conduit network 11 and valves 56. The function of the purge gas unit 30 is to deliver a purge gas to the dryer tanks 16 to regenerate the desiccant material therein by removing (desorbing) water that was adsorbed onto the desiccant material during the drying cycle of the system 10. As previously noted, this operation is the regeneration cycle of the system 10 and occurs within the regenerating dryer tank 16. The purge gas unit 30 is shown as including a purge gas dryer tank 32 having a purge tank inlet 34 at an upper end 38 of the tank 32 and a purge tank outlet 36 at a lower end 40 of the tank 32. Both the inlet 34 and outlet 36 are fluidically connected to an interior cavity 19 of the purge gas dryer tank 32 that contains a bed of desiccant material (not shown). As discussed below, the purge gas unit 30 has multiple different operations that include heating the purge gas to produce a heated purge gas that can be delivered to the regenerating dryer tank 16, or adsorbing water vapor (and optionally other liquids) entrained in the purge gas to produce a dried purge gas that can be delivered to the regenerating dryer tank 16. The desiccant material within the purge gas dryer tank 32 can be the same as or different from the desiccant material used in the dryer tanks 16.

In the embodiment shown in FIGS. 9 through 12, the purge gas is represented as being drawn from atmospheric air through a purge gas inlet 44 through the action of a blower 46 (or other suitable pumping means) driven by an electric motor 48. The portion of the conduit circuit 11 between the purge gas inlet 44 and purge gas dryer tank 32 is represented in FIGS. 9 through 12 as further including a silencer 50 for suppressing noise generated by the flowing purge gas, and a heater 52 adapted to heat the purge gas during one or more phases of the regeneration cycle, as discussed below. The heater 52, which may use electricity, gas, steam, etc., to produce heat, is preferably capable of heating the purge gas, for example, to a temperature of about 320 to 450° F. (about 160 to 232° C.) or more and preferably to a temperature of about 375 to 400° F. (about 190 to 204° C.), though the invention is not limited to any particular temperature. The blower 46, motor 48, silencer 50, and heater 52 are all considered to be components of the purge gas unit 30. Though atmospheric air is well suited for use as the purge gas, it is foreseeable that a gas other than atmospheric air could be used. Furthermore, various other equipment could be substituted for the blower 46, motor 48, silencer 50 and heater 52.

FIGS. 9 through 12 further represents the valves 56 and 58 as means for selectively fluidically connecting the purge tank outlet 36 to the inlet 20 of either dryer tank 16 or an exhaust 54 to atmosphere. The purge gas exiting the purge tank outlet 36 flows through one of the valves 56 while en route within the conduit network 11 to the inlet 20 of one of the dryer tanks 16, or flows through the valve 58 if en route within the conduit network 11 to the exhaust 54. As will be discussed in more detail below, the valves 56 and 58 enable the purge gas to be routed through either dryer tank 16 to perform a regeneration cycle within that tank 16, or routed to the exhaust 54 without passing through either tank 16.

Figure 11:
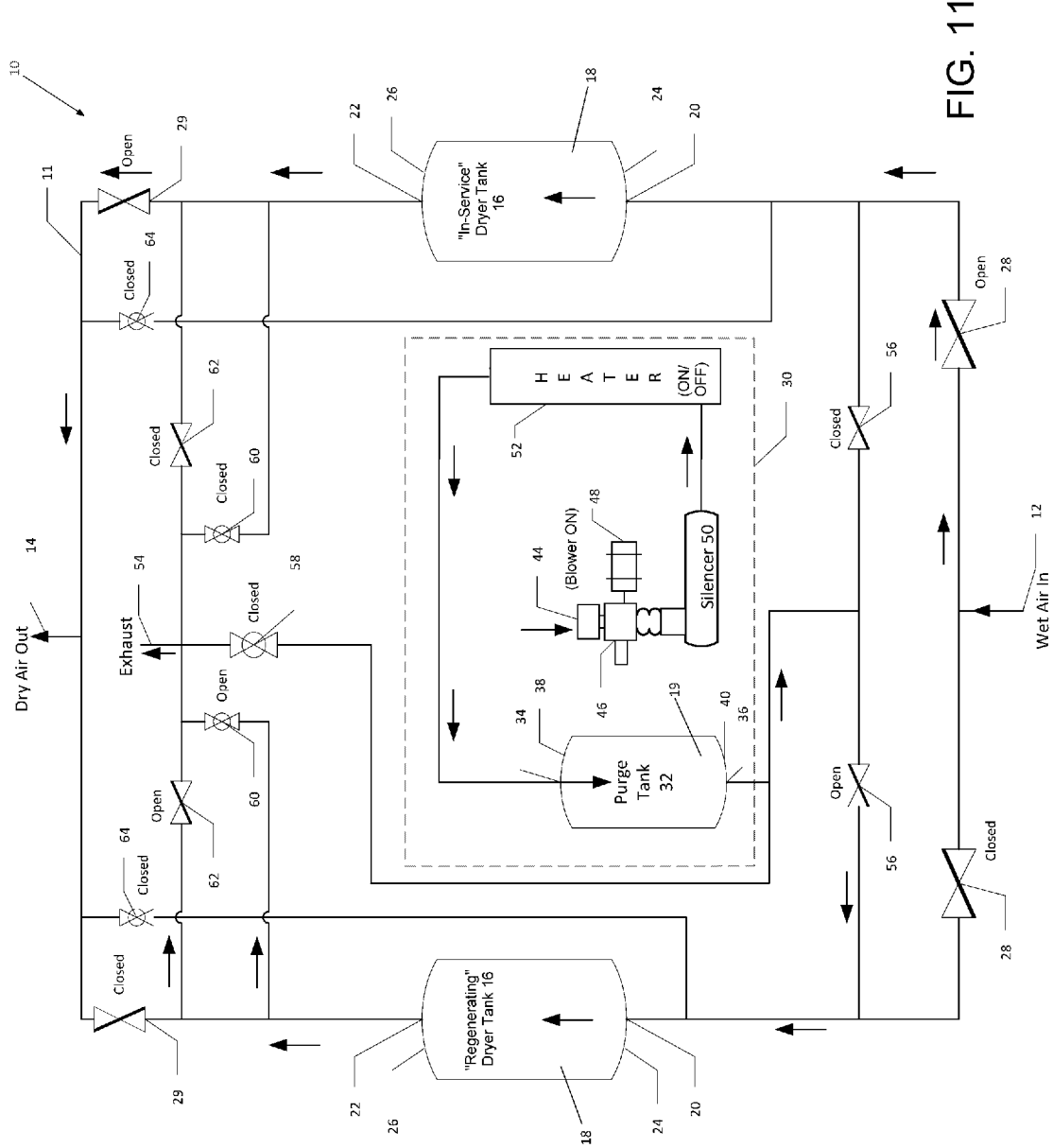

The purge gas unit 30 can be utilized in various ways to regenerate the desiccant materials within the dryer tanks 16 during a regeneration cycle. A particular but nonlimiting example of a regeneration cycle comprises multiple different phases. One such phase of the regeneration cycle is represented in FIG. 11 and referred to herein as a regeneration heating phase (or simply "heating phase") that entails the purge gas unit 30 delivering the aforementioned heated purge gas to the desiccant material of the regenerating dryer tank 16 to desorb moisture therefrom. During the regeneration heating phase, the heater 52 of the purge gas unit 30 is operated ("ON") to heat the purge gas drawn through the purge gas inlet 44, after which the heated purge gas is delivered to the bed of desiccant material within the regenerating dryer tank 16 to desorb moisture therefrom. During the regeneration heating phase, the valve 56 connecting the purge gas dryer tank 32 to the regenerating dryer tank 16 is open, and the valves 56 and 58 connecting the purge gas dryer tank 32 to, respectively, the in-service dryer tank 16 and the exhaust 54 are closed. Furthermore, the valve 29 connecting the regenerating dryer tank 16 to the system outlet 14 is closed, as are the valves 62 and 64 connecting the regenerating dryer tank 16 to the exhaust 54.

Another phase of the regeneration cycle follows the regeneration heating phase performed on the desiccant material of the regenerating dryer tank 16. This phase, also represented in FIG. 11 and referred to herein as a regeneration primary cooling phase (or simply "cooling phase"), entails the purge gas unit 30 delivering the aforementioned dried (unheated) purge gas to the desiccant material of the regenerating dryer tank 16 after it has undergone the regeneration heating phase. For this phase, the heater 52 of the purge gas unit 30 is not operated ("OFF") and the unheated purge gas (for example, at or near atmospheric temperatures) is dried as a result of passing through the bed of desiccant material within the purge gas dryer tank 32. The desiccant within the dryer tank 32 is cooled by the unheated purge gas, and the relatively cool dried purge gas is then delivered to the regenerating dryer tank 16. This phase of the regeneration cycle serves to cool the desiccant material of the regenerating dryer tank 16 before a drying cycle is again performed with the tank 16. As with the regeneration heating phase, the valve 56 connecting the purge gas dryer tank 32 to the regenerating dryer tank 16 is open during the regeneration primary cooling phase, and the valves 56 and 58 connecting the purge gas dryer tank 32 to, respectively, the in-service dryer tank 16 and the exhaust 54 are closed.

A third phase of the regeneration cycle follows the regeneration cooling phase performed on the regenerating dryer tank 16 and precedes a regeneration heating phase to be performed on an in-service dryer tank 16. This phase, represented in FIG. 10 and referred to herein as a regeneration preheating phase (or simply "preheating phase"), prepares the purge gas dryer tank 32 and its desiccant material for the next regeneration heating phase. The regeneration preheating phase entails the purge gas unit 30 delivering heated purge gas to the bed of desiccant material of the purge gas dryer tank 32 to desorb moisture therefrom. For this phase, the heater 52 of the purge gas unit 30 is operated to heat the purge gas and the heated purge gas is passed through the desiccant material within the purge gas dryer tank 32 to desorb moisture therefrom, after which the now moisture-bearing purge gas is vented through the exhaust 54 without passing through either dryer tank 16. During the regeneration preheating phase, the valves 56 connecting the purge gas dryer tank 32 to both dryer tanks 16 are closed, and the valve 58 connecting the purge gas dryer tank 32 to the exhaust 54 is open.

Figure 9:
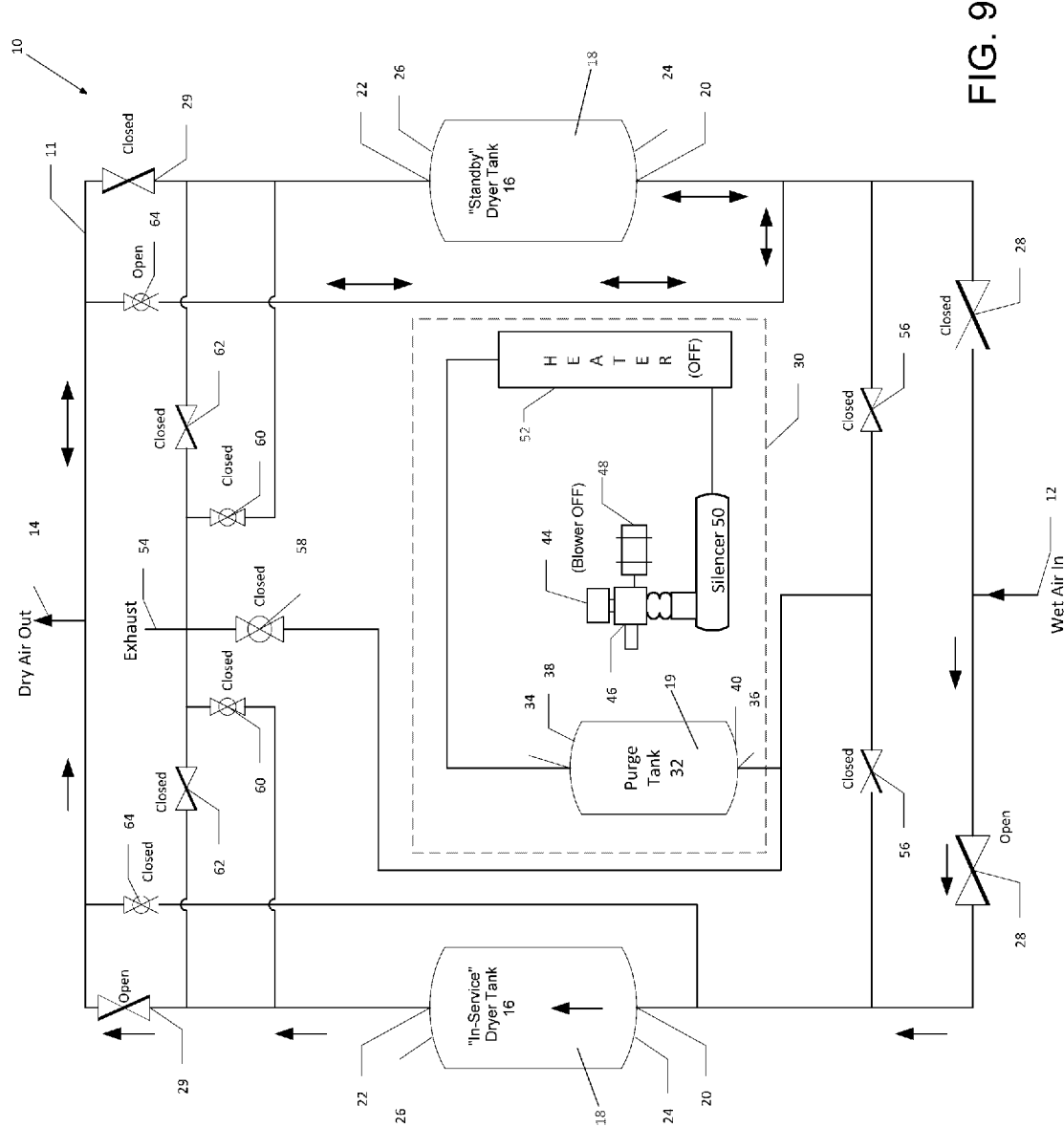
FIGS. 9, 10, 11, and 12 are fluid circuit diagrams schematically representing different operational cycles and phases of the system of FIGS. 1 through 3.
Figure 12:
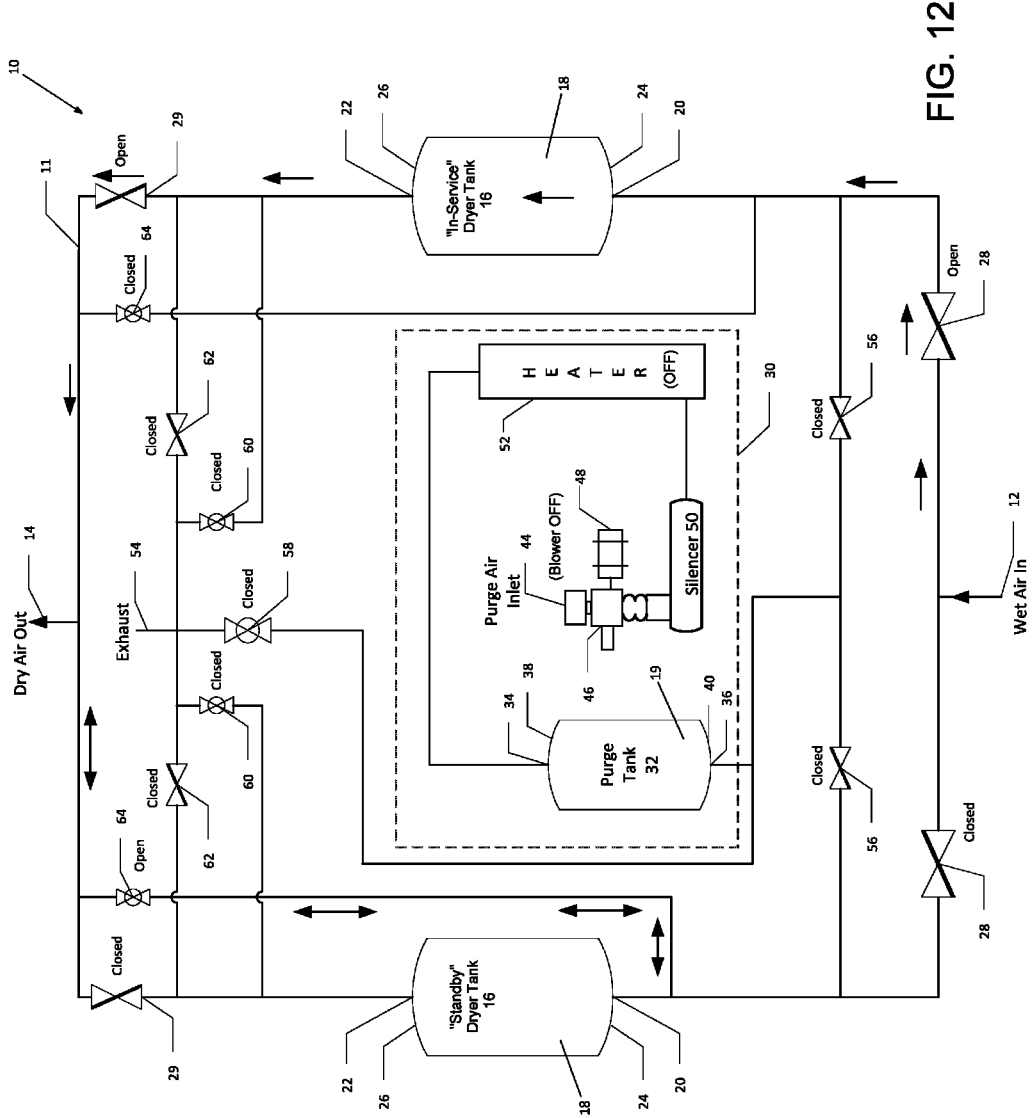

The valves 60, 62 and 64 connecting the inlets 20 and outlets 22 of the dryer tanks 16 to the system outlet 14 and exhaust 54 are provided for use during other possible cycles and phases of the operation of the system 10, discussed in more detail below in reference to FIGS. 9 through 12. Briefly, the valves 60 are primarily utilized to depressurize the dryer tanks 16 (FIG. 11), the valves 62 are primarily utilized to vent the purge gas exiting the dryer tanks 16 to atmosphere through the exhaust 54 (FIG. 11), and the valves 64 are primarily utilized to repressurize a regenerated dryer tank 16 at the end of the regeneration cycle with dried compressed air from the in-service dryer tank 16, so that the regenerated tank 16 is maintained at an elevated pressure while in a "standby" mode (FIGS. 9 and 12).

Figure 5:
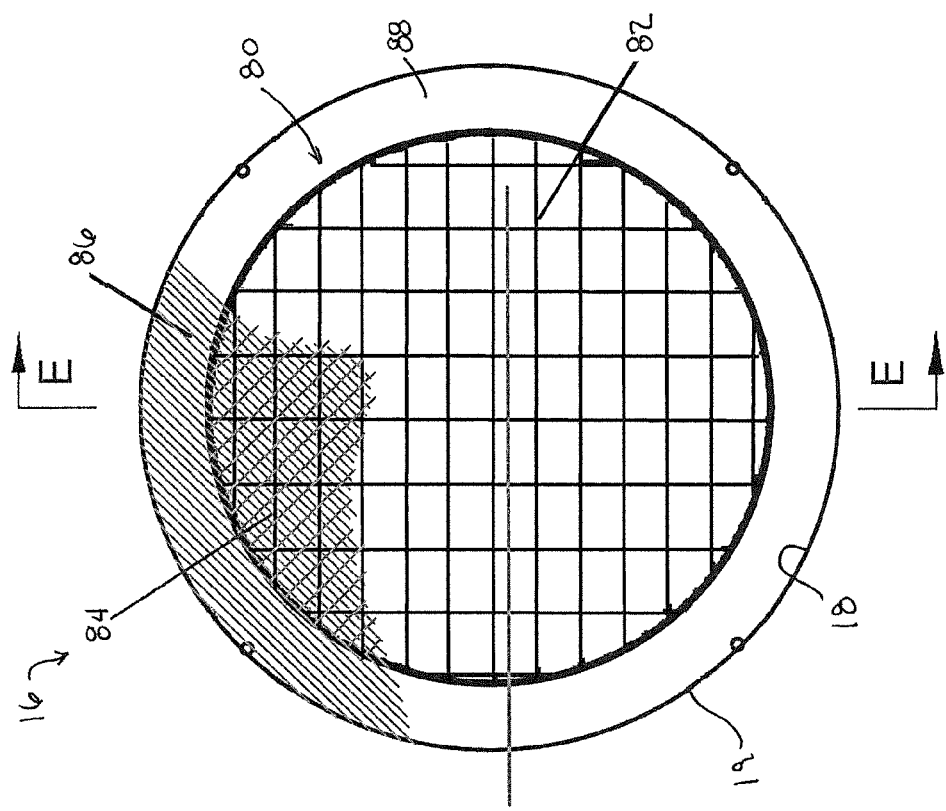
FIGS. 4, 5, and 6 are cross-sectional views representative of one of the dryer tanks of the system taken along, respectively, section lines A-A, B-B, and C-C of FIG. 3.
Figure 4:
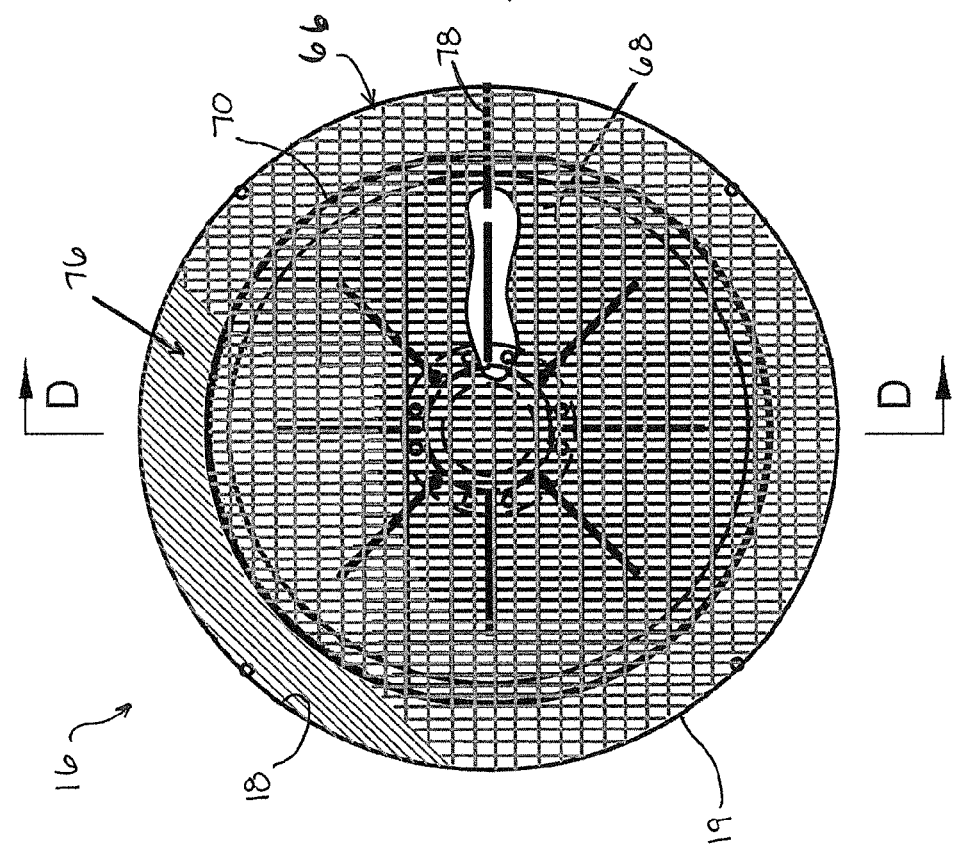
Figure 6:
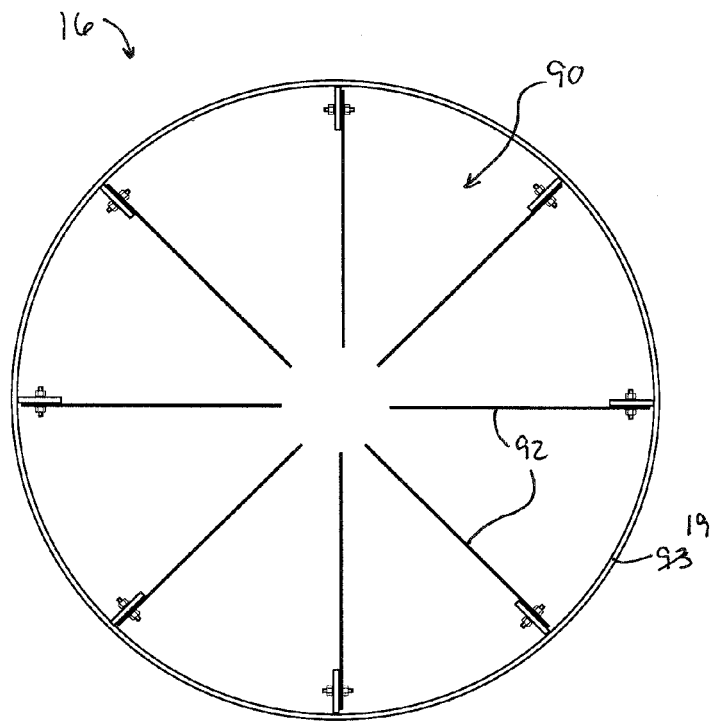
Figure 7:
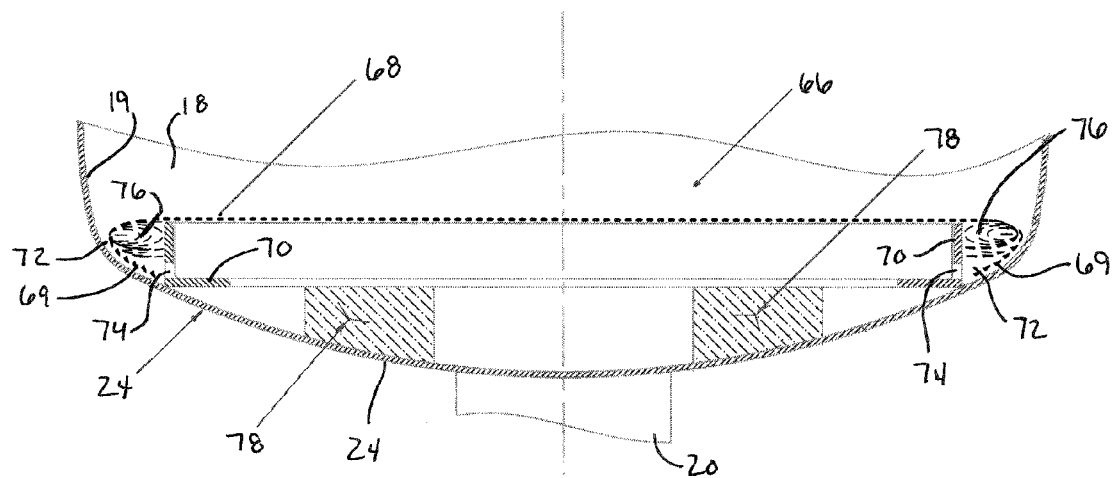
FIG. 7 is a cross-sectional view representative of the dryer tank of FIG. 4 taken along section line D-D.
Figure 8:
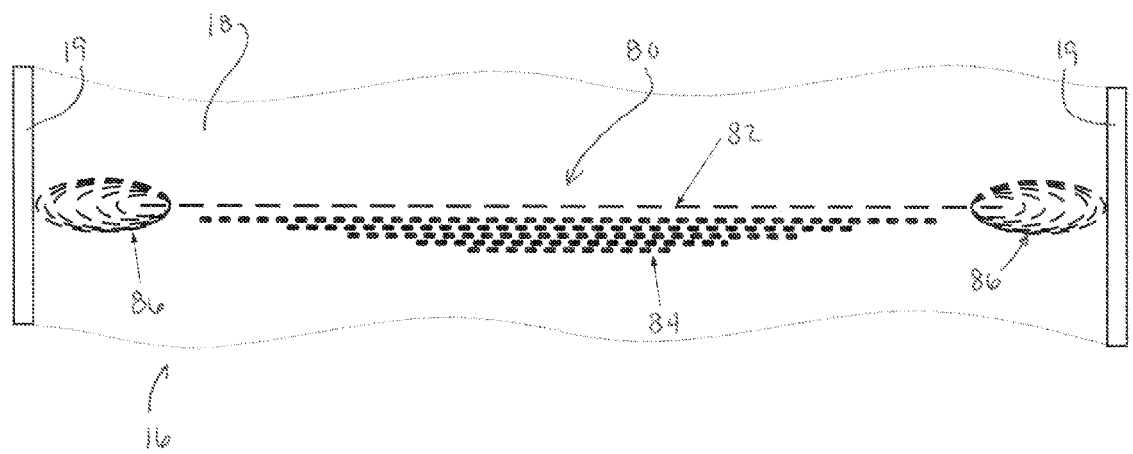
FIG. 8 is a cross-sectional view representative of the dryer tank of FIG. 5 taken along section line E-E.

According to a preferred aspect, the tanks 16 and 32 of the system 10 are equipped with means for promoting the regeneration and drying cycles performed on their respective desiccant materials. Certain features of such means are represented in FIGS. 4 through 8, which are indicated in the drawings as being cross-sections of one of the dryer tanks 16. In particular, FIGS. 4 and 7 are indicated as being cross-sections through the lower end 24 of one of the dryer tanks 16 visible in FIG. 3, FIGS. 5 and 8 are indicated as being cross-sections through the upper end 26 of the same dryer tank 16, and FIG. 6 is indicated as being a cross-section through a midsection of the same dryer tank 16. FIGS. 4 and 7 are also representative of a preferred construction provided at the lower end 40 of the purge gas dryer tank 32, and therefore the following discussion of FIGS. 4 and 7 should be understood to describe preferred constructions for the lower ends 24 and 40 of all three tanks 16 and 32, though FIGS. 4 and 7 and the following discussion will only refer to reference numbers pertaining to the dryer tanks 16.

FIGS. 4 and 7 represent a gas distribution unit 66 located within one of the dryer tanks 16 between its inlet 20 and the bed of desiccant material (not shown) within the interior cavity 18 of the tank 16. The gas distribution unit 66 is configured as a means for promoting a more even distribution of the compressed air and the purge gas through the desiccant material after entering the tank 16 through its inlet 20, so that the entire volume of desiccant material will more uniformly adsorb moisture during the drying cycle and will more uniformly be heated, cooled, and desorb moisture during the regeneration cycle.

The gas distribution unit 66 is represented in FIGS. 4 and 7 as comprising a pervious grate 68 (a fragment of which is shown in FIG. 4) supported by a frame 70. The grate 68 is schematically represented as having openings or holes therethrough. The openings of the grate 68 may be of uniform size, though a uniform size is not required. The size of the openings in the grate 68 preferably promotes the ability of the gas distribution unit 66 to distribute the compressed air and the purge gas, which enters the tank 16 through the inlet 20 located below the gas distribution unit 66, across nearly the entire circular cross-sectional area of the tank 16. The bed of desiccant material contacts and is supported by the grate 68. As such, the holes in the grate 68 are preferably small enough to prevent particles of the desiccant material from falling through the gas distribution unit 66 into the tank inlet 20. A nonlimiting example of a particularly suitable construction for the grate 68 is a corrugated sheet material that is available under the name "Por-O-Septa" and contains rows of openings (slits) on uniform centers, with the material between slits being alternately dimpled up and down to form loops of metal on both sides of the sheet material. The openings in the grate 68 are preferably of sufficient size and number such that the gas distribution unit 66 has a total open area of at least three times the cross-sectional area of the inlet 20. A suitable but nonlimiting example of an opening size for the grate 68 is about 0.063 inch (about 1.6 mm).

A nonlimiting example of a particularly suitable construction for the frame 70 is a ring formed of angle iron, as represented in FIGS. 4 and 7. The bottom of the frame 70 contacts the lower end 24 of the tank 16, creating an annular-shaped cavity 72 between the exterior wall 19 of the tank 16 and the perimeter of the frame 70. Drain holes 74 are provided in the frame 70 to enable any liquid within the cavity 72 to be drained according to applicable codes. The gas distribution unit 66 may optionally further include a second grate (not shown) between the grate 68 and frame 70 for supporting the grate 68 within the interior of the frame 70. As the optional grate is intended to support the grate 68 and the weight of the desiccant material supported by the grate 68, openings thereof are significantly larger than the holes in the grate 68, for example, 1.375×4 inches (about 3.5×10 cm).

Based on a tank 16 having a circular cross-section, the grate 68 preferably has a diameter of at least 80% of the diameter of the tank 16, and more preferably extends to the wall 19 of the tank 16. As shown in FIG. 7, an outer peripheral portion 69 of the grate 68 is deformed to extend downward into the annular-shaped cavity 72 surrounding the frame 70. FIGS. 4 and 7 further show the gas distribution unit 66 as having a pervious member 76 (a fragment of which is shown in FIG. 4) located within the cavity 72. The peripheral portion 69 of the grate 68 is represented as being partially wrapped around the outer perimeter of the pervious member 76. The pervious member 76 is intended to inhibit desiccant material from plugging the drain holes 74 in the frame 70, as well as to serve as a demister by promoting the condensation of moisture in the compressed air, after which the condensation is able to collect and flow though the drain holes 74 to exit the tank 16 through its inlet 20. A nonlimiting example of a suitable construction for the pervious member 76 is a crimped and rolled wire mesh that contains rows of openings that are smaller than the openings in the grate 68.

FIGS. 4 and 7 show the gas distribution unit 66 as supported by arms 78, which may be attached to the frame 70 or to the lower end 24 of the tank 16. The arms 78 serve to support the gas distribution unit 66, and the weight of the desiccant material supported by the gas distribution unit 66, above the inlet 20 of the tank 16. The arms 78 are depicted as being arranged in a radial pattern so as not to interfere with, and may instead promote, the radially outward flow of the compressed air and purge gas from the inlet 20 of the tank 16. To promote the effectiveness of the gas distribution unit 66, it is believed that the arms 78 preferably support the grate 68 a vertical distance from the inlet 20 of at least 80% of the diameter of the inlet 20.

As noted above, flow of the compressed air and purge gas during the drying and regeneration cycles is from the lower ends 24 of the tanks 16 toward the upper ends 26, which is opposite the conventional flow direction through desiccant dryer tanks during regeneration. The tendency that this bottom-to-top flow through the tanks 16 might suspend or otherwise cause movement of the beds of desiccant material within the tanks 16 is countered by a gas barrier unit 80 shown in FIGS. 5 and 8. The gas barrier unit 80 is disposed within each dryer tank 16 between its desiccant material and outlet 22 to physically contact and constrain the upper surfaces of the beds of desiccant material within the tanks 16 and as a means to promote the distribution of the compressed air and purge gas through the desiccant materials. More particularly, the gas barrier unit 80 is physically located on top of the bed of desiccant material to effectively weigh or press down on the desiccant material and contain the upper surface of the bed in a shape to promote even distribution of the compressed air and purge gas throughout the desiccant material.

The gas barrier unit 80 is represented in FIGS. 5 and 8 as comprising pervious upper and lower grates 82 and 84 (a fragment of the latter is shown in FIGS. 5 and 8). The upper and lower grates 82 and 84 both have openings or holes therethrough, but a preferred aspect of the invention is that the lower grate 84 has smaller openings than the upper grate 82. The openings within each individual grate 82 and 84 are preferably of uniform size, though a uniform size may not necessarily be required. The lower grate 84 is represented in FIG. 8 as comprising multiple layers that are preferably attached (for example, wired) to the upper grate 82. Suitable materials for the upper and lower grates 82 and 82 include, but are not limited to, wire screen and wire mesh, respectively. As an example, the upper grate 82 may be formed of the same crimped and rolled wire mesh as that described for the pervious member 76 of the gas distribution unit 66. The upper grate 82 serves as an atrial barrier and maintains the location of the lower grate 84 and its individual layers, such that the upper grate 82 and lower grate 84 (including its multiple layers) are in the form of an assembled unit.

FIG. 8 further shows the individual layers of the lower grate 84 as decreasing in size (width/diameter) in the downward direction away from the upper grate 82, such that the lower grate 84 generally projects downward into the bed of desiccant supporting the gas barrier unit 80. This configuration creates and controls a back pressure within the tanks 16 that promotes a more uniform flow distribution of the compressed air and purge gas through the bed of desiccant material within each tank 16. The individual layers of the lower grate 84 may have openings of the same size that, when the layers are arranged together as shown, create tortuous paths through the lower grate 84 that are each narrower than the individual openings in the layers. The holes in the upper grate 82 are preferably small enough to prevent the desiccant material from passing through the gas barrier unit 80 and becoming entrained in the compressed air or purge gas exiting the tank 16 through its outlet 22. For this purpose, the smallest openings in the grate 82 should have a maximum dimension of less than, and more preferably not greater than about one-half of, the diameter (or maximum dimension) of the individual particles of the desiccant material to prevent desiccant particles from passing entirely through the gas barrier unit 80. The total open area defined by the openings in the gas barrier unit 80 is preferably equal to or smaller than the total open area defined by the openings of the gas distribution unit 66 to serve as a restriction to flow through the tanks 16, thereby promoting a back pressure capable of achieving a more even flow through the bed of desiccant material in each tank 16. This function of the gas distribution unit 66 is promoted by spacing the gas barrier unit 80 a vertical distance below the outlet 22, creating a space within the tank 16 above the gas barrier unit 80 that does not contain desiccant material. In practice, a suitable vertical distance between the gas barrier unit 80 and outlet 22 is believed to be approximately equal to the diameter of the outlet 22. To further promote its back pressure function, FIGS. 5 and 8 further show the gas barrier unit 80 as having a pervious member 86 (a fragment of which is shown in FIG. 4) located within an annular gap 88 between the wall 19 of the tank 16 and the outer perimeters of the upper and lower grates 82 and 84. The pervious member 86 can be similar or identical to the pervious member 76 of the gas distribution unit 66 described in reference to FIGS. 4 and 7. As such, a nonlimiting example of a suitable construction for the pervious member 86 is a crimped and rolled wire mesh that contains rows of openings that are smaller than the openings in the upper and lower grates 82 and 84.

Each dryer tank 16 also preferably contains a thermal dispersion unit 90 (FIG. 6) as a means for evenly distributing heat within their desiccant materials. The thermal dispersion unit 90 facilitates the transfer of heat through the beds of desiccant materials within the tanks 16 to promote a more even temperature distribution during the drying and regeneration cycles. For example and as discussed in more detail below, following the regeneration primary cooling phase each dryer tank 16 preferably enters the aforementioned standby mode (FIGS. 9 and 12), during which the tank 16 undergoes a secondary cooling phase of the regeneration cycle while neither compressed air nor purge gas flows through the tank 16, in which case the thermal dispersion unit 90 is able to facilitate the transfer of heat from the center of the desiccant bed to outer portions of the bed and then to the wall 19 of the tank 16. The thermal dispersion unit 90 may also be capable of promoting a more uniform distribution of the compressed air or purge gas within the tanks 16 during the drying and regeneration cycles.

As represented in FIG. 6, the thermal dispersion unit 90 comprises a number of panels 92 that are attached to the wall 19 of the dryer tank 16 and project inward into the bed of desiccant along radials of the diameter of the tank 16. The panels 92 may be located anywhere within each tank 16 between their respective gas distribution and gas barrier units 66 and 80, and may extend substantially the entire vertical distance between the gas distribution and gas barrier units 66 and 80. For purposes of conducting heat within the beds of desiccant, the panels 92 are preferably formed of a thermally conductive material, for example, a corrosion-resistant (stainless) steel, aluminum, copper, or other material that may be compatible with the compressed air, purge gas, and gas conditions.

The blower 46 can be operated to deliver the heated or dried (unheated) purge gas at pressures below that of the compressed air that enters the system 10 through the inlet 12, for example, at pressures of about 1.5 to 5 psig (about 10 to 34 kPa). According to a preferred aspect, the blower 46 is capable of operating at various different speeds to deliver the heated or unheated purge gas at a rate that is appropriate for the particular phase of the regeneration cycle. For example, lower flow rates may be appropriate for the regeneration preheating phase of the regeneration cycle, which is performed solely on the purge gas dryer tank 32, as compared to the regeneration heating and cooling cycles performed on the dryer tanks 16. The flow rate delivered by the blower 46 and the temperature of the purge gas achieved with the heater 52 may also be controlled depending on the moisture content of the purge gas (air) drawn from atmosphere, the temperature and/or moisture content of the heated or dried purge gas as it enters the dryer tanks 16, and/or the temperature and/or moisture content of the desiccant materials within the dryer tanks 16. Furthermore, the operation of the blower 46 and heater 52 may be controlled to take into account the air and gas flow characteristics and temperatures within the tanks 16 and 32 resulting from the functions of their gas distribution units 66, gas barrier units 80, and thermal dispersion units 90. As nonlimiting examples, the blower 46 may be controlled to take into account the air and gas flow characteristics within the tanks 16 and 32 resulting from the gas distribution created within the tanks 16 and 32 by their gas distribution units 66 and the back pressure created within the tanks 16 by their gas barrier units 80, and the heater 52 may be controlled to take into account the temperatures at various locations within the tanks 16, whose uniformity is promoted by their thermal dispersion units 90. In combination, the gas distribution units 66, gas barrier units 80, thermal dispersion units 90, blower 46, heater 52, purge gas, and compressed air gas are able to work together for greater efficient use of the desiccant bed of an in-service dryer tank 16 (FIGS. 9 through 12), more efficient regeneration of the desiccant bed in a regenerating dryer tank 16 (FIG. 11), and more uniform temperatures within the desiccant bed of a tank 16 in "standby" mode (FIGS. 9 and 12). This approach can be accomplished by determining an optimal combination of blower speeds and heater element excitation for the intake temperature and moisture content of the purge gas, coupled with the temperature of the desiccant material at multiple locations within the dryer tanks 16, to obtain a desired temperature throughout the desiccant material. A suitable control means for this purpose (not shown) is well within the capability of those of ordinary skill in the art, and therefore will not be discussed in any detail here.

Referring again to FIGS. 1 through 3, the entire system 10 can preferably be mounted on multiple mobile bases 94 that support different portions of the system 10, including the dryer tanks 16, purge gas dryer tank 32, and the various other components described in reference to FIGS. 9 through 12. The bases 94 preferably allow for a modular construction of the system 10 so that different portions of the system 10 can be installed and removed as separable modules. As an example, the tanks 16 and 32 and sections of the conduit network 11 are shown mounted on one base 94, and the blower 46, heater 52, and other sections of the conduit network 11 are shown mounted on a second and separate 94. All conduit and electrical connections are preferably a plug-in style to simplify shipping, on-site assembly, and installation.

In use, the system 10 provides for drying and regeneration cycles capable of increasing the efficiency of the desiccant materials in the dryer tanks 16 by controlling the air and purge gas flow through the desiccant materials, particularly through the cooperation of the gas distribution unit 66 located at the lower ends 24 of the tanks 16, the gas barrier unit 80 located at the upper ends 26 of the tanks 16, and the thermal dispersion unit 90 embedded within their desiccant materials. The pressure drop within the tanks 16 can be controlled with the gas distribution unit 66 and gas barrier unit 80 so that flow through the desiccant materials is substantially uniform throughout the entire bed of desiccant material in each tank 16, and heat transfer within the beds of desiccant materials can be promoted with the thermal dispersion unit 90 so that temperatures within the desiccant material are more evenly distributed during the heating and cooling phases of the regeneration cycle.

A preferred manner in which the system 10 may be operated will now be described in reference to FIGS. 9 through 12. To facilitate the following description, the terms "lefthand" and "righthand" will be used in reference to the orientation of the system 10 represented in FIGS. 9 through 12, and therefore are relative terms but should not be otherwise interpreted as limitations to the construction, installation, operation or and use of the system 10.

In FIG. 9, which represents a drying cycle being performed within only the lefthand side of the schematic, the lefthand dryer tank 16 is identified as being in-service and the righthand dryer tank 16 is identified as being a "standby" dryer tank 16 as a result of being in standby mode. Compressed air (or another suitable gas) is represented as entering the system 10 through its inlet 12 and flowing through the lefthand valve 28 to the in-service dryer tank 16. Within the in-service dryer tank 16, the compressed air flows upwardly through its interior cavity 18, where it passes through its gas distribution unit 66, desiccant material, and gas barrier unit 80 before exiting through its outlet 22. Because the lefthand valve 29 is open and the lefthand valves 60 and 62 are closed, the resulting dried compressed air exits the system 10 through the system outlet 14. The inlet 20 of the standby dryer tank 16 is connected to the outlet 22 of the in-service dryer tank 16 through the righthand valve 64 so that dry compressed air maintains the standby dryer tank 16 at system pressure, but does not flow through the standby dryer tank 16 because other valves connected thereto, namely, righthand valves 28, 29, 56, 60, and 62, are closed. The blower 46 and heater 52 are both identified as "off."

Figure 10:
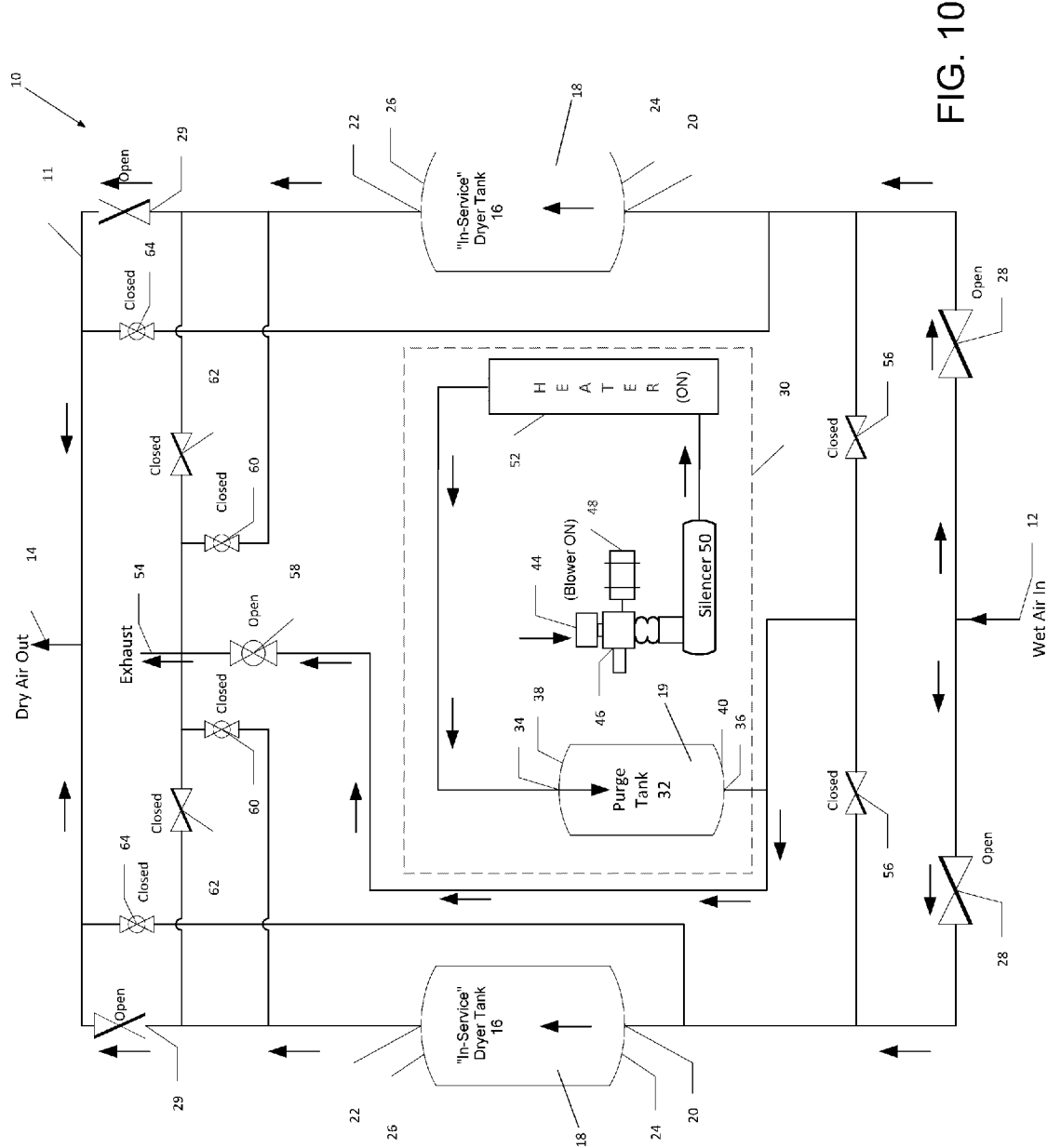

As the desiccant bed within the in-service dryer tank 16 becomes saturated with moisture, the dew point temperature of the dried compressed air that exits the in-service dryer tank 16 and system outlet 14 rises. At such time that the dried compressed air reaches a threshold, for example, −40° C., regeneration of the in-service dryer tank 16 is initiated. FIG. 10 schematically represents the preheating phase of the regeneration cycle, during which time the purge gas dryer tank 32 is prepared for regenerating the desiccant material within the in-service dryer tank 16. FIG. 10 identifies the lefthand dryer tank 16 as still being in service, and identifies the previously-designated standby dryer tank 16 as also now being in service as a result of opening the righthand valves 28 and 29 and closing of the righthand valve 64. The valves 56, 60, 62 and 64 are all closed during the preheating phase.

To accomplish the preheating phase, the valve 58 has been opened to connect the purge gas unit 30 to the system exhaust 54, and the motor 48 and heater 52 are both "on" so that the blower 46 pumps purge gas (e.g., atmospheric air) through the heater 52 and purge gas dryer tank 32, where the heated purge gas passes through the gas distribution unit 66 of the tank 32 and heats the desiccant bed to evaporate any moisture within the tank 32 before the moisture-bearing purge gas is vented from the system 10 (for example, to atmosphere) through the valve 58 and exhaust 54. The purge gas flow rate and temperature provided by the blower 46 and heater 52 are preferably controlled according to the condition (humidity and temperature) of the purge gas entering the purge gas unit 30 through the purge gas inlet 44, the condition (humidity and temperature) of the purge gas exiting the purge gas unit 30, and the moisture content and temperature of the desiccant material within the purge gas dryer tank 32. At the completion of the preheating phase, the desiccant material within the purge gas dryer tank 32 has been prepared for the heating phase of the regeneration cycle to be performed on the lefthand dryer tank 16, which during the preceding drying cycle (FIG. 9) was the only dryer tank 16 in service.

Because both dryer tanks 16 are in service during the preheating phase, both generate dried compressed air that can be combined. Specifically, FIG. 10 represents the compressed air entering the system 10 through the system inlet 12 and flowing through each of the valves 28 to each of the in-service dryer tanks 16. The resulting dried compressed air exits both dryer tanks 16 before passing through the valves 29 and exiting the system 10 together through the system outlet 14, resulting in what may be referred to as a blending phase of the drying cycle that can occur simultaneously with the preheating phase of the regeneration cycle.

FIG. 11 schematically represents the heating and cooling phases of the regeneration cycle performed on the lefthand dryer tank 16, now identified as the regenerating dryer tank 16. The heating and cooling phases are accomplished by closing the valve 58 that had connected the purge gas unit 30 to the system exhaust 54 during the preheating phase, closing the lefthand valves 28 and 29 of the lefthand (and subsequently regenerating) dryer tank 16, and opening the lefthand valve 60 to depressurize the regenerating dryer tank 16, after which the valve 56 is opened to connect the purge gas unit 30 to the regenerating dryer tank 16. The lefthand valve 62 can remain closed until the regenerating tank 16 is depressurized, after which the lefthand valve 62 is also opened so that the lefthand valves 60 and 62 connect the regenerating dryer tank 16 to the system exhaust 54. The blower 46 and heater 52, which are preferably de-energized at the conclusion of the preheating phase, are re-energized for the regeneration heating phase of FIG. 11 to initially cooperate to pump heated purge gas through the purge gas dryer tank 32 and into the regenerating dryer tank 16. Within the regenerating dryer tank 16, the heated purge gas heats the desiccant bed to a temperature sufficient to evaporate (desorb) substantially all of the moisture from its desiccant material (for example, about 320 to 400° F. (about 160 to 205° C.)), after which the moisture-bearing purge gas exits the tank 16 through its outlet 22 and is vented to the system exhaust 54 through the valves 60 and 62. Regeneration of the desiccant material within the regenerating dryer tank 16 can be monitored with temperature and humidity sensors (not shown). In particular, the purge gas flow rate and temperature provided by the blower 46 and heater 52 are preferably controlled according to the condition (humidity and temperature) of the purge gas entering the purge gas unit 30 through the purge gas inlet 44, the condition (humidity and temperature) of the purge gas exiting the purge gas unit 30, and the moisture content and temperature of the desiccant material within the regenerating dryer tank 16.

The heater 52 is preferably turned "off" once the desiccant bed within the regenerating dryer tank 16 reaches a temperature sufficient to have evaporated substantially all of the moisture from its desiccant material. The system 10 then enters the regeneration primary cooling phase during which the purge gas continues to be pumped by the blower 46 but, with the heater 52 off, gradually cools while continuing to flow through the desiccant material of the regenerating dryer tank 16 so that the cooler purge gas cools the desiccant bed therein to a suitable uniform temperature, ultimately yielding what can be referred to as a regenerated desiccant material. During the regeneration primary cooling phase, the purge gas is dried by the desiccant material within the purge gas dryer tank 32 to ensure that the purge gas does not add moisture to the desiccant material in the regenerating dryer tank 16. In particular, water vapor entrained in the purge gas entering through the purge gas inlet 44 is adsorbed by the desiccant material within the purge gas dryer tank 32 to produce the dried purge gas, which then flows upwardly through the regenerating dryer tank 16 to cool the desiccant material that had been heated during the immediately preceding regeneration heating phase performed on the regenerating dryer tank 16. Under preferred operating conditions, the dried purge gas is not required to desorb (remove) moisture from the desiccant material within the regenerating dryer tank 16 due to the high temperatures sustained by the desiccant material during the previous heating phase. The purge gas flow rate provided by the blower 46 is preferably controlled according to the condition (temperature and humidity) of the purge gas and the moisture content and temperature of the desiccant material within the regenerating dryer tank 16. The purge gas, with desorbed liquid entrained therein, exits through the outlet 22 of the regenerating dryer tank 16 and then exits the system 10 through the system exhaust 54 via the valves 60 and 62.

During the regeneration cycle performed on the regenerating dryer tank 16, the righthand in-service dryer tank 16 continues to desorb moisture from compressed air that enters the system 10 through its inlet 12 and, after being dried within the in-service dryer tank 16, exits the system 10 through the system outlet 14 through the righthand valve 29.

FIG. 12 schematically represents the final phase of the regeneration cycle performed on the lefthand regenerating dryer tank 16, now identified as the standby dryer tank 16, while the righthand dryer tank 16 remains in service. As such, the roles of the dryer tanks 16 in FIG. 12 have been reversed relative to their roles indicated in FIG. 9. The aforementioned secondary cooling phase of the regeneration cycle can be performed under the conditions represented in FIG. 12. During the secondary cooling phase, the purge gas is no longer required to be pumped by the blower 46 to cool the desiccant material in the lefthand (standby) dryer tank 16. Instead, further cooling of the desiccant bed is accomplished by thermal conduction promoted by the thermal dispersion unit 90, which conducts heat within the desiccant material near the center of the desiccant bed to the walls 19 of the standby dryer tank 16 where it is transferred largely by convection to the surrounding atmosphere. As such, the secondary cooling phase of the regeneration cycle is able to occur while neither compressed air nor purge gas flows through the standby dryer tank 16.

As represented in FIG. 12, the lefthand valves 60 and 62 have been closed so that the standby dryer tank 16 is no longer vented to atmosphere through the system exhaust 54, the lefthand valve 56 has been closed, and the lefthand valve 64 has been opened to repressurize the standby dryer tank 16. As such, the standby dryer tank 16 has been made ready to be placed back in service once the moisture level of the dried compressed air exiting the in-service (righthand) dryer tank 16 reaches a sufficient level as indicated by its dew point temperature, for example, −40° C.

From the foregoing description of FIGS. 9 through 12, it should be evident that a drying cycle can be continuously performed with at least one of the dryer tanks 16 (designated as "in-service") throughout the operation of the system 10. In FIG. 9, the valves 28 and 29 to and from only one of the dryer tanks 16 (the in-service dryer tank 16 on the lefthand side of FIG. 9) are open and the corresponding valves 28 and 29 of the other tank 16 (the standby dryer tank 16 on the righthand side of FIG. 9) are closed so that compressed air entering the system 10 through the system inlet 12 only flows through the in-service dryer tank 16, where the drying cycle occurs. In FIG. 10, the blending phase of the drying cycle is underway as a result of the valves 28 and 29 to and from both dryer tanks 16 (the in-service dryer tanks 16 on both sides of FIG. 10) being open so that compressed air entering the system 10 through the system inlet 12 flows through both dryer tanks 16, and the drying cycle occurs in both tanks 16. Also in FIG. 10, the preheating phase of a regeneration cycle is underway as a result of the operation of the purge gas unit 10. At the conclusion of the preheating phase of the regeneration cycle, the heating and primary cooling phases of the regeneration cycle are performed on the regenerating dryer tank 16 (on the lefthand side of FIG. 11) while the drying cycle continues within the in-service dryer tank 16 (on the righthand side of FIG. 11). As evident from FIG. 11, valve settings can remain the same throughout the heating and primary cooling phases so that purge gas from the purge gas unit 30 only flows through the regenerating dryer tank 16 and compressed air entering the system 10 through the system inlet 12 only flows through the in-service dryer tank 16. In FIG. 12, the valve settings have been altered to place the regenerating dryer tank 16 on the lefthand side of FIG. 11 into standby mode while the drying cycle continues within the in-service dryer tank 16 on the righthand side of FIG. 11. In particular, the valves 28 and 29 to and from only the in-service dryer tank 16 are open and the corresponding valves 28 and 29 of the standby dryer tank 16 are closed so that compressed air entering the system 10 through the system inlet 12 only flows through the in-service dryer tank 16.

While the invention has been described in terms of specific or particular embodiments, it is apparent that other forms could be adopted by one skilled in the art. For example, the system 10 and its components could differ in appearance and construction from the embodiment described herein and shown in the drawings, functions of certain components of the system 10 could be performed by components of different construction but capable of a similar (though not necessarily equivalent) function, and appropriate materials could be substituted for those noted. Furthermore, the sizes of the dryer tanks 16 and 32 and other components of the system 10 may be varied to accommodate different system pressures, flow rates, and gases, in which case various dimensions, sizes, distances, percentages, etc., may also be varied from those discussed above. Accordingly, it should be understood that the invention is not limited to any embodiment described herein or illustrated in the drawings. It should also be understood that the phraseology and terminology employed above are for the purpose of describing the illustrated embodiments, and do not necessarily serve as limitations to the scope of the invention. Therefore, the scope of the invention is to be limited only by the following claims.

The invention claimed is:

1. A system having at least first and second dryer tanks for drying a compressed gas to produce a dried compressed gas, the first and second dryer tanks each having an interior cavity and a desiccant material within the interior cavity adapted to adsorb a liquid entrained in the compressed gas and produce the dried compressed gas, the system having a system inlet through which the compressed gas enters the system and a system outlet through which the dried compressed gas exits the system, the system comprising:
   a purge gas dryer tank having an interior cavity;
   means for pumping a purge gas through the interior cavity of the purge gas dryer tank;
   a purge gas desiccant material within the interior cavity of the purge gas dryer tank and adapted to adsorb water vapor entrained in the purge gas and produce a dried purge gas therefrom;
   means for heating the purge gas pumped through the interior cavity of the purge gas dryer tank to produce a heated purge gas; and
   connecting means for selectively fluidically connecting the purge gas dryer tank to the first and second dryer tanks to regenerate the desiccant materials therein by flowing at least one of the dried purge gas and the heated purge gas therethrough to remove the liquid adsorbed on the desiccant materials.

2. The system according to claim 1, wherein each of the first and second dryer tanks has a dryer tank inlet at a lower end thereof and a dryer tank outlet is at an upper end thereof, and the connecting means causes the dried purge gas and the heated purge gas to flow upward through the first and second dryer tanks.

3. The system according to claim 2, further comprising gas distribution means within each of the first and second dryer tanks between the dryer tank inlet thereof and the desiccant material thereof for promoting distribution of the compressed gas and the purge gas through the desiccant material.

4. The system according to claim 2, further comprising gas barrier means within each of the first and second dryer tanks between the desiccant material thereof and the dryer tank outlet thereof for contacting and constraining the desiccant material within the first and second dryer tanks and generating a back pressure to thereby promote distribution of the flows of the compressed gas and the purge gas through the desiccant material.

5. The system according to claim 2, further comprising thermal dispersion means within each of the first and second dryer tanks and embedded in the desiccant material thereof for conducting heat within the desiccant material to walls of the first and second dryer tanks.

6. A system for drying a compressed gas to produce a dried compressed gas, the system comprising:
   a system inlet through which the compressed gas enters the system and a system outlet through which the dried compressed gas exits the system;
   at least first and second dryer tanks, each of the first and second dryer tanks having an interior cavity and a dryer tank inlet and a dryer tank outlet that are both fluidically connected to the interior cavity, the dryer tank inlet being fluidically connected to the system inlet and the dryer tank outlet being fluidically connected to the system outlet whereby the compressed gas entering the first and second dryer tanks through the dryer tank inlets thereof flows through the interior cavities of the first and second dryer tanks;
   first and second desiccant materials within the interior cavities of, respectively, the first and second dryer tanks, the first and second desiccant materials being effective to adsorb a liquid entrained in the compressed gas that enters the system through the system inlet to produce the dried compressed gas that exits the system through the system outlet;
   means for switching between the first and second dryer tanks whereby the compressed gas is caused to selectively flow through either or both of the first and second dryer tanks at any given time; and
   a purge gas unit comprising a purge gas inlet, at least one purge gas dryer tank having an interior cavity and a purge gas desiccant material within the interior cavity thereof and adapted to adsorb water vapor, pumping means adapted to draw a purge gas from the purge gas inlet and pump the purge gas through the purge gas desiccant material of the purge gas dryer tank, and heating means adapted to heat the purge gas prior to the purge gas being pumped through the purge gas desiccant material of the purge gas dryer tank; and
   connecting means for selectively causing the purge gas to flow from the purge gas dryer tank to either the dryer tank inlet of the first dryer tank, the dryer tank inlet of the second dryer tank, or a system exhaust;
   wherein the system is configured and operable to perform a drying cycle during which the compressed gas enters the first dryer tank through the dryer tank inlet thereof, the compressed gas flows through the interior cavity of the first dryer tank, the first desiccant material adsorbs the liquid entrained in the compressed gas to produce the dried compressed gas, and the dried compressed gas exits the system through the system outlet; and
   wherein the system is configured and operable to perform a regeneration cycle during which the pumping means draws the purge gas from the purge gas inlet and causes the purge gas to flow through the interior cavity of the purge gas dryer tank and then flow through the first dryer tank to remove the liquid adsorbed on the first desiccant material thereof.

7. The system according to claim 6, wherein the heating means heats the purge gas during a regeneration preheating phase to produce a heated purge gas, the heated purge gas flows through the interior cavity of the purge gas dryer tank to remove water vapor adsorbed on the purge gas desiccant material, and the heated purge gas with the water vapor entrained therein is vented from the system through the system exhaust.

8. The system according to claim 6, wherein the heating means heats the purge gas during a heating phase of the regeneration cycle to produce a heated purge gas, the connecting means fluidically couples the purge gas dryer tank to the first dryer tank, and the heated purge gas removes the liquid adsorbed on the first desiccant material in the first dryer tank.

9. The system according to claim 6, wherein during a cooling phase of the regeneration cycle the purge gas desiccant material of the purge gas dryer tank adsorbs water vapor entrained in the purge gas to produce a dried purge gas, the connecting means fluidically couples the purge gas dryer tank to the first dryer tank, and the dried purge gas cools the first desiccant material in the first dryer tank.

10. The system according to claim 6, wherein the dryer tank inlet of each of the first and second dryer tanks is at a lower end thereof, the dryer tank outlet of each of the first and second dryer tanks is at an upper end thereof, and the switching means causes the compressed gas to selectively flow upward through either or both of the first and second dryer tanks.

11. The system according to claim 6, wherein the connecting means fluidically connects the purge gas dryer tank to the first and second dryer tanks so that the purge gas flows upwardly through the interior cavities of the first and second dryer tanks.

12. The system according to claim 6, further comprising gas distribution means within each of the first and second dryer tanks between the dryer tank inlet thereof and the first or second desiccant material thereof for promoting distribution of the compressed gas and the purge gas through the first and second desiccant materials.

13. The system according to claim 6, further comprising gas barrier means within each of the first and second dryer tanks between the first or second desiccant material thereof and the dryer tank outlet thereof for contacting and constraining the first and second desiccant materials within the first and second dryer tanks and generating a back pressure to thereby promote distribution of the flows of the compressed gas and the purge gas through the first and second desiccant materials.

14. The system according to claim 6, further comprising thermal dispersion means embedded in the first and second desiccant materials for conducting heat within the first and second desiccant materials to walls of the first and second dryer tanks, respectively.

15. The system according to claim 6, wherein the pumping means is a variable frequency blower adapted to flow varying volumes of the purge gas.

16. The system according to claim 6, further comprising means for controlling the heating means and the pumping means based on a temperature and moisture content of at least one of the compressed gas, the purge gas, and the first and second desiccant materials.

17. The system according to claim 6, further comprising at least a first mobile base on which the first and second dryer tanks are mounted and at least a second mobile base that is separate from the first mobile base and on which the pumping means and the heating means are mounted.

18. A method of regenerating a first desiccant material within at least a first dryer tank configured for drying a compressed gas, the method including a regeneration cycle using a purge gas, the regeneration cycle comprising:

a heating phase during which the purge gas is heated to produce a heated purge gas, and the heated purge gas is then directed through the first dryer tank to regenerate the first desiccant material therein by removing liquid adsorbed on the first desiccant material; and a cooling phase during which the purge gas is pumped through a purge gas dryer tank containing a purge gas desiccant material to adsorb water vapor entrained in the purge gas to produce a dried purge gas, and the dried purge gas is then directed through the first dryer tank to cool the first desiccant material.

19. The method according to claim 18, the method further including a drying cycle occurring during the regeneration cycle, the drying cycle comprising:

flowing the compressed gas through a second desiccant material within a second dryer tank configured for drying the compressed gas, wherein the second desiccant material adsorbs a liquid entrained in the compressed gas to produce a dried compressed gas.

20. The method according to claim 18, the regeneration cycle further comprising:

a preheating phase during which the purge gas is heated to produce the heated purge gas, the heated purge gas is then directed through the purge gas desiccant material to remove water vapor adsorbed on the purge gas desiccant material, and then the heated purge gas with the water vapor entrained therein is vented to atmosphere.

21. The method according to claim 18, further comprising distributing the compressed gas and the heated and dried purge gases within the first dryer tank with a gas distribution means disposed between an inlet of the first dryer tank and the first desiccant material.

22. The method according to claim 18, further comprising constraining the first desiccant material within the first dryer tank to promote distribution of the flows of the compressed gas and the heated and dried purge gases through the first desiccant material with a gas barrier means disposed between an outlet of the first dryer tank and the first desiccant material.

23. The method according to claim 18, further comprising conducting heat within the first desiccant material to walls of the first dryer tank with a thermal dispersion means embedded in the first desiccant material.

24. The method according to claim 18, further comprising controlling the temperature and/or flow rate of the purge gas through the first dryer tank based on a temperature and moisture content of at least one of the compressed gas, the heated purge gas, and the dried purge gas.

* * * * *